INVENTORS
RICHARD T. EGAN
LAWRENCE M. ROBERTS
BY Stowell & Stowell
ATTORNEYS.

United States Patent Office 3,509,695
Patented May 5, 1970

3,509,695
WET BOTTOM PRECIPITATOR
Richard T. Egan, Basking Ridge, and Lawrence M. Roberts, Bound Brook, N.J., assignors to Research-Cottrell, Inc., Bridgewater, N.J., a corporation of New Jersey
Filed July 21, 1965, Ser. No. 473,783
Int. Cl. B03c 3/74
U.S. Cl. 55—120                4 Claims

ABSTRACT OF THE DISCLOSURE

An electrostatic precipitator having a plurality of hoppers positioned beneath the electrodes, with the hoppers being filled with a liquid. Collected particles abstracted from the dirty gas fall into the liquid and are carried away. The liquid is recirculated, a portion is discharged to waste, and new liquid is drawn into the system.

---

This invention relates to an electrostatic precipitator for the removal of ash and other suspended matter from gaseous products of combustion and exhibits utility in a wide variety of manufacturing and other industrial operations. More particularly, the invention relates to an electrostatic precipitator which includes a plurality of hoppers filled with water, with the water being constantly in part recirculated, in part removed and in part replenished, with the collected particles from the gases being carried away from the precipitator by the recirculating water.

Electrostatic precipitators have enjoyed wide use and acceptance in connection with many industrial processes and are well known to workers in this art. A common or basic form of an electrostatic precipitator comprises a plurality of generally parallel wires, termed the grid wires, positioned between parallel collecting electrodes or plates, with the incoming particle-laden gas passing between the parallel plates. The grid wires are charged to a high potential to produce a high electric field between the grid wires and the plates. The particles in the gas collect on the plates which conveniently may be shaken, either continuously or periodically, to remove the collected particles therefrom.

In an electrostatic precipitator of this general type, it has been observed that there has been a tendency for the incoming gas to pass through a portion of the electrostatic precipitator below the intended flow path, i.e., below the flow path for the gases, defined by the space between the parallel plates. This tendency is termed "sneakage" and results in an incomplete treating of the gas, since the dirty, or particle-laden gases which do not pass through the intended flow path do not receive the intended electrostatic treatment which effects the separation of the particles from the gas. A further problem in electrostatic precipitators of this type is the requirement that the collected particles be periodically or continually taken away from the electrostatic precipitator so that there will be no build up or accumulation of particles within the precipitator.

According to the practice of this invention, a plurality of hoppers are filled with water and are positioned below the collecting electrodes. The electrodes are vibrated to dislodge particles which collect thereon and the particles fall into the water in the hoppers. The water in the hoppers is maintained in constant motion and there is also a constant drainage from the hoppers thereby effecting constant or steady flow or removal of the particles from the precipitator. The hoppers then represent a discharge outlet at each location thereof and since the discharge outlet is filled with water, there can be no sneakage of the incoming dirty gas through the hopper exit. Further, the peripheral portions at adjoining banks of the hoppers are provided with upstanding walls to the approximate level of the lowest portions of the collecting electrodes to inhibit sneakage.

According to the further practice of this invention, the water level in the individual hoppers is maintained constant so that there can be no variation of water level between the hoppers and make-up water is continually introduced into the system defined by the plurality of hoppers to replenish the particle-laden water which is withdrawn. In addition, water is constantly recirculated within the system itself, to thereby admit of a continuous agitation or motion.

Figure 1:
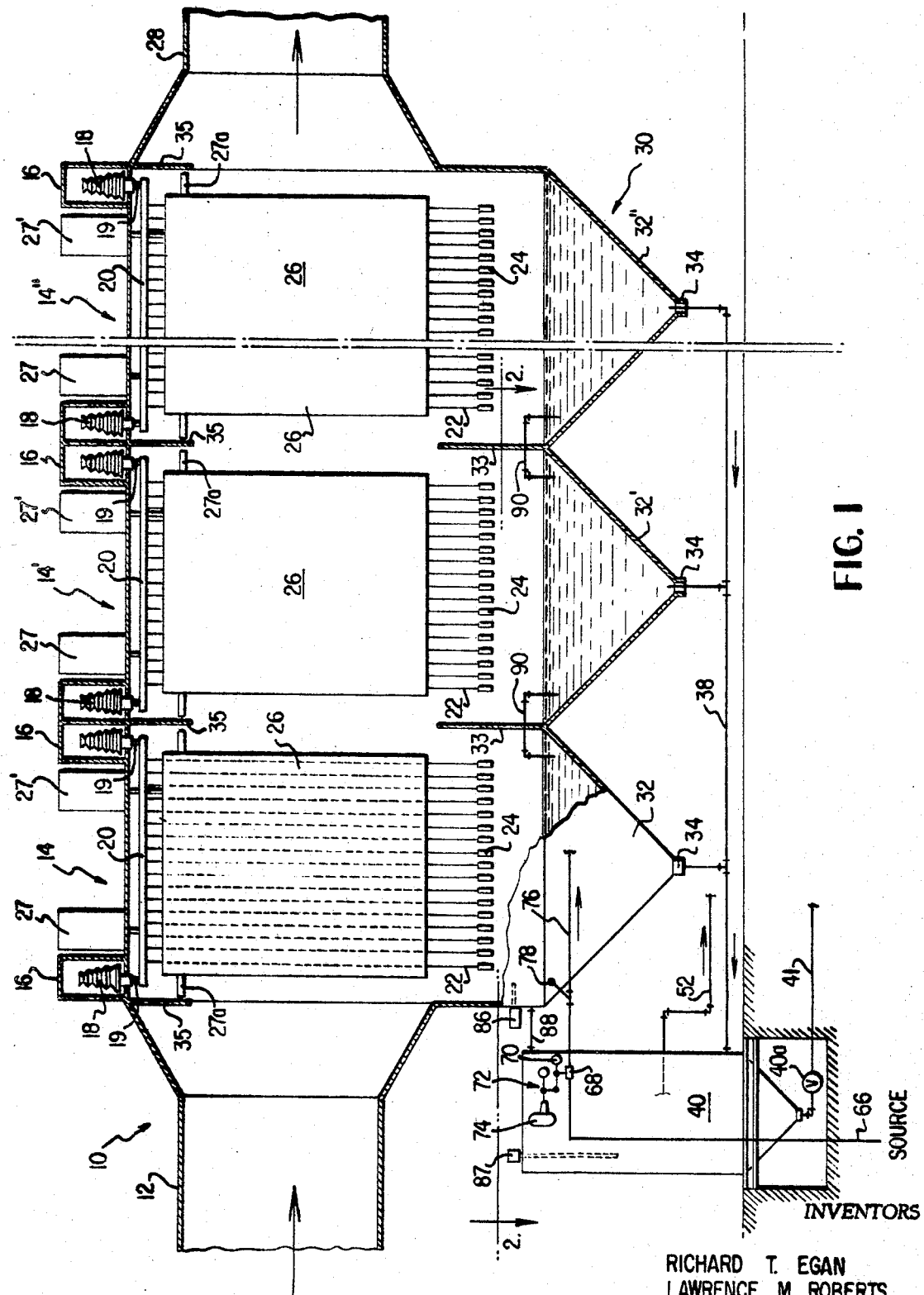
FIG. 1 is a partially schematic, cross-sectional elevation of the electrostatic precipitator of this invention.

Referring now to the drawings, the numeral 10 denotes, generally, the electrostatic precipitator of this invention and includes an inlet duct 12 through which dirty gases, i.e., gases laden with particles, are adapted to pass into the precipitator. The numerals 14, 14' and 14", each denote a bank of collecting electrodes. The numeral 16 in each bank denotes a housing for insulator 18 which in turn supports the supply electrode 19, there being at least two such housings for each of the banks 14, 14' and 14". The numeral 20 in each electrode bank denotes a horizontally disposed supporting bar coupled electrically to supply electrode 19 and adapted to receive the high, direct current potential therefrom. The potential is supplied from a source, not illustrated, the details of which are well known to workers in this art and hence will not be here described. Each horizontally disposed bar 20 is preferably formed of a suitable conductor, such as a metal, and supports a plurality of downwardly extending discharge electrodes, or grid wires 22. Each of the latter carries at its lower end a weight 24 to assist in maintaining it in the illustrated position under the force of gases which strike the grids upon their passage through the precipitator. The numerals 26 denote collector plate electrodes each disposed in a vertical plane and are parallel to each other. Thus the grid wires 22 extend downwardly between the parallel collector electrodes 26 and, referring now to FIG. 2 of the drawings, the plates 26 and grids 22 extend, in alternate, vertically disposed parallel planes, entirely across the width of the precipitator 10. Each of the banks 14, 14' and 14" is similarly constructed with respect to the electrodes 22 and 26.

The numerals 27 and 27' at each bank denote mechanical vibrators to impart vibratory motion to the electrodes 22 and 26 to thereby dislodge any particulate material which may accumulate thereon. Supports 27a at each bank support the parallel collector plate electrodes 26.

The numeral 28 denotes the exit duct or exit conduit for leading the treaded gases away from the precipitator 10. In many installations, the duct 28 leads to an exhaust device, such as a common chimney, for release of the now clean gas to atmosphere.

Referring now to FIG. 1 of the drawings, the numeral 30 denotes, generally, a plurality of hoppers, with the hoppers in each bank denoted, respectively, by the numerals 32, 32' and 32". Each hopper, at its top portion, is generally rectangular and narrows down towards the bottom portion to thereby define a generally inverted pyramidal shape. Eoch hopper is filled with water up to the indicated level of FIG. 1. Generally upstanding septa or wall portions 33 extend upwardly along the juncture of the banks, as shown at FIG. 1. Septa 33 cooperate with complementary septa 35 at the upper portion of the precipitator to help maintain the flow of gases between the precipitating electrodes, i.e., the septa inhibit the flow of gases above and below the precipitating electrodes.

Figure 2:
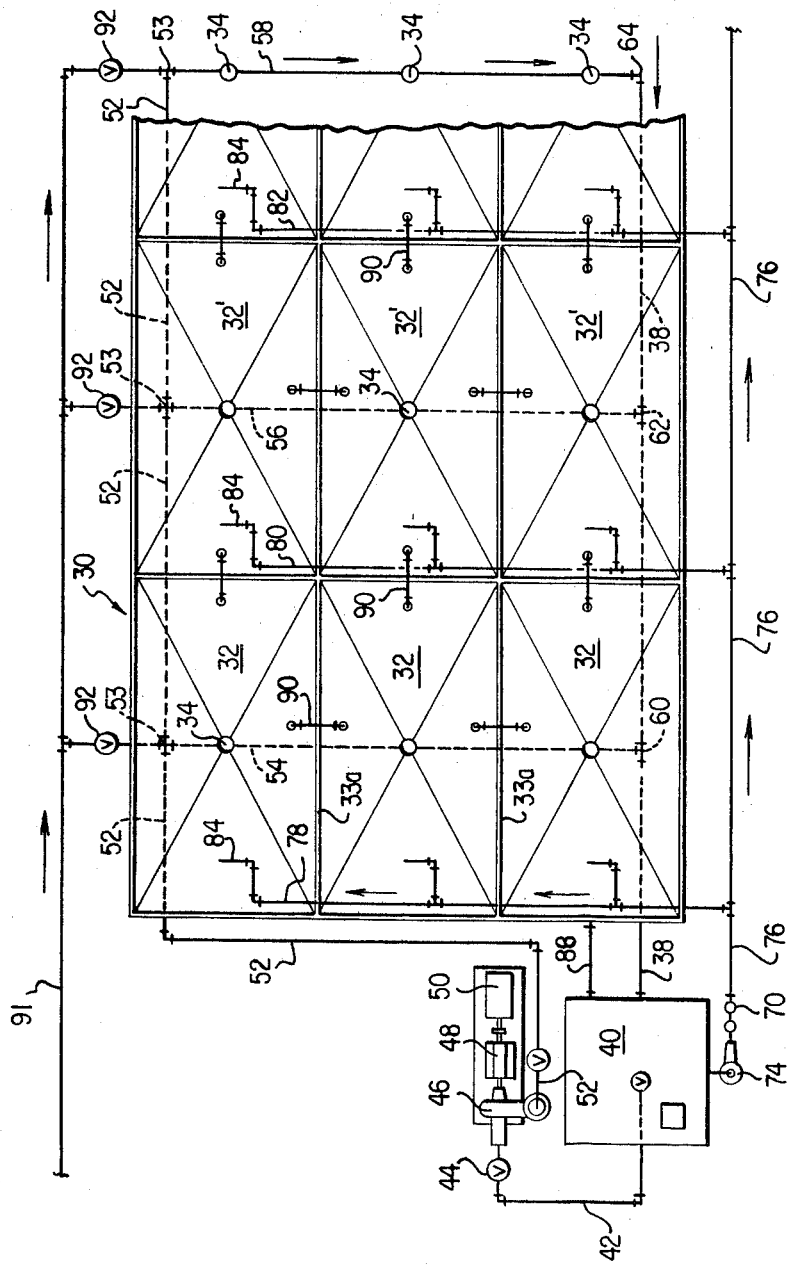
FIG. 2 is a partially schematic top plan view taken along line 2—2 of FIG. 1.

The bottom portion of each of the hoppers terminates at portions denoted by the numerals 34 and each feeds into a flow line 38. This latter flow line feeds into a surge and reservoir tank 40, the output line of which is denoted by the numeral 42 (see FIG. 2) for flow through valve 44 into a pump 46. A transmission 48 couples the pump to a prime mover 50, conveniently an electric motor, with the output from the pump discharging into line 52. As seen in FIG. 2, line 52 extends lengthwise of the precipitator 10 and at each bank 14, 14' and 14", is in fluid communication with line 54, 56, and 58, respectively. The bottoms 34 of the hoppers feed into the flow lines 54, 56, and 58 and are coupled to line 38 by T fittings 60, 62, and 64.

Referring again to FIG. 1 of the drawings, a fluid supply line 66 feeding from any convenient fresh water source is coupled to a valve 68 whose flow position is controlled by weight 70 acting in cooperation with a linkage 72 and a water level sensing device 74. The output of valve 68 is coupled to flow line 76 which runs along the length of the precipitator 10. Make-up water is introduced into individual hoppers 14, 14' and 14" by means of flow lines 78, 80, and 82, respectively. The latter lines are fed by conduit 76. The ends of each of these latter flow lines are denoted by the numeral 84 and extend into the individual hoppers just below the surface of the water therein. Water from the line 76 which discharges through terminal portions 84 not only supplies make-up water, but also imparts a rotating motion, in a clockwise direction as viewed in FIG. 2, to the water in each of the hoppers since it enters the hoppers substantially horizontally.

As shown in FIG. 1, a high water alarm 86 is placed adjacent the lower portion of the precipitator 10 to give a warning in the event the water level within the hoppers rises above the maximum level. A similar alarm 87 is provided in tank 40. As indicated by the numeral 88, there is a static electricity discharge line between the body of the precipitator 10 and the surge and reservoir tank 40 to preclude any build-up of electrical charge on the main body of the precipitator 10 and to thereby localize high electrical potentials within the spaces between the grids 22 and the plates 26.

The numerals 90 (FIG. 1) denote inverted U-shaped siphons which extend through the septa 33 and are supported thereby. Other siphons 90 (FIG. 2) are supported by the walls 33a between the hoppers. The siphons are filled with water, with their lower ends extending into and between adjacent hoppers. The function of the siphons 90 is to maintain the water level uniform throughout all of the hoppers. Thus, should the water level at any single hopper rise or lower, for any reason, water from adjacent hoppers will flow to maintain an equilibrium.

The mode of operation of the electrical precipitator described above is as follows.

Gases laden with particulate material are introduced into the precipitator through inlet duct 12 and pass through the first bank 14 of collecting precipitator electrodes defined by grid wires 22 and parallel plates 26. The flow continues, passing through the various banks 14', 14", and exits through duct 28 of the precipitator 10. In this passage of gas, the electric field between the grid and collector electrodes effects a separation of the particles from the gas, with the particles collecting, for the most part, on plates 26. Some of the particulate material may collect on grids 22. From time to time, or continuously if found convenient for a particular type of gas, vibrators 27 and 27' act and impart vibratory motion to the grids and to the plates 26. The particulate material dislodged from the precipitating electrodes falls into the various hoppers of the banks, falling into the water therein.

There is a continuous recirculation in a closed fluid path of water. This path is defined (here see FIG. 2) by conduit 52, lines 54 (56 and 58), conduit 38, surge and reservoir tank 40, line 42, valve 44, and pump 46, thence back to flow line 52. The particulate material falling into the hoppers forms a sludge at the bottom portions therein and this sludge is continually withdrawn from the bottom portions 34 of the hoppers, with the sludge returning through line 38. Upon entering tank 40 from line 38, the heavier particulate material which defines the sludge is withdrawn from the bottom of tank 40 as indicated at disposal line 41. The line 41 is coupled to any convenient source of disposal for the sludge. A valve 40a in line 41 controls the density of slurry removed from the system through line 41. The valve may be manually adjusted or adjusted automatically by continuous monitoring of the slurry density in line 41. Make-up water, equal in volume to the volume of water discharged through line 41, is introduced from line 66 through valve 68, thence to line 76 for subsequent injection into end portions 84 of lines 78, 80, and 82. The sensing element 74 maintains the level of water within tank 40 at a predetermined level and regulates the amount of water drawn in from the fresh water source through line 66 by means of the linkage 72 at the controlling valve 68. A line 91, coupled to lines 54, 56, and 58 through valves 92, is coupled to any desired (not illustrated) source of water for cleaning purposes during a system shutdown.

As an example of parameters which have been found successful for a bank of 12 hoppers each about 10 feet wide and 20 feet long, the pump 46 causes a flow of 3,000 g.p.m. in a 12-inch diameter line which defines flow line 52. At each of the junctions 53 (see FIG. 2), approximately 750 gallons per minute leave flow line 52 and mix with the outgoing sludge at openings 34 for return to the tank 40 through line 38. This return is made possible by junctions 60, 62, and 64 which couple the flow line 38 to lines 54, 56, and 58. In a practical embodiment of the invention, 8-inch diameter conduits have been used successfully on the lines 54, 56, and 58. The volume of make-up water passing to the individual hoppers through conduit 76 may vary from approximately 100 to 300 gallons per minute, with the same volume being discharged through line 41. It has been found that with the discharge of the slurry (sludge) of approximately 100 gallons per minute, the discharge through line 41 is approximately 30% slurry, while with the discharge of approximately 300 gallons per minute, the slurry is reduced to approximately 15% of the outgoing water in line 41.

In the embodiment of FIGS. 1 and 2, the line 52–54–38 may be considered a first fluid line, the line 66 may be considered a second fluid line, the line 76 may be considered a third fluid line, the line 41 may be considered a fourth fluid line. The line 91 may be considered a flushing line.

Figure 3:
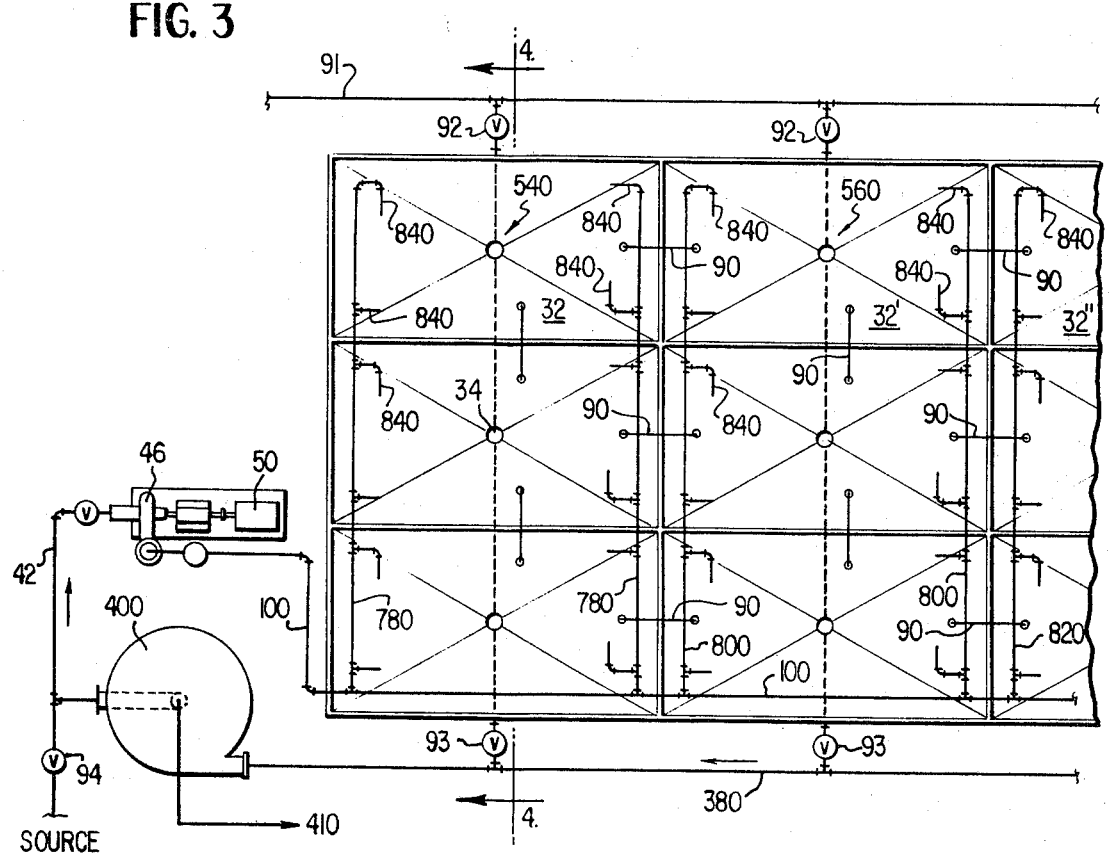
FIG. 3 is a view similar to FIG. 2, showing a modification.
Figure 4:
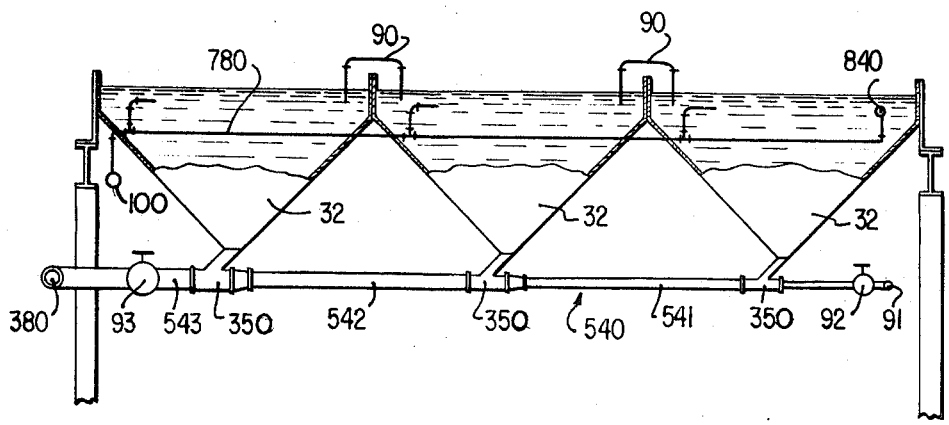
FIG. 4 is a view taken along line 4—4 of FIG. 3.

Referring now to FIGS. 3 and 4 of the drawings, an embodiment of the invention is illustrated. In the description of this embodiment, the same reference numerals have been applied to corresponding elements. In certain instances, the reference numerals have been raised by a factor of 100 in order to preserve similarity of nomenclature. As before, the numerals 32, 32' and 32" denote adjacent banks of hoppers or sumps positioned below the electrostatic precipitator discharge elements. The embodiment of FIGS. 3 and 4 differs essentially from that of FIGS. 1 and 2 in the hydraulic circuitry associated with the sumps or hoppers, the discharge electrode structure and other associated elements above the hoppers being the same. Again, each sump is provided with means to impart rotation of the liquid therein and here such means includes four nozzles positioned in each hopper, the nozzles each being denoted by the numeral 840. The reader will observe that the illustrated configuration of the nozzles in each sump 32 serves to impart counterclockwise rotation to the liquid therein. The input line 42 to the pump 46 is connected to a surge tank 400 and the pump output passes through conduit 100 to lines 780, 800, and 820 in the banks for discharge through nozzles 840.

During operation of the electrostatic precipitator, particles separated from the dirty gases by the discharge electrodes fall into the liquid in the several sumps and liquid therein passes down into exits 34 in the bottom of the sumps. As indicated at FIG. 4 of the drawings, line 540 connects the outputs of the sumps 32 together and comprises three portions 541, 542, and 543 of successively increasing diameters, coupled together with T fittings 350, the top legs of which are connected to openings 34. As illustrated at FIG. 4 of the drawings, the construction of each of the T fittings 350 is such that the top leg of the T makes an angle of approximately 45° with the longitudinal axis of the main portion of the T. This angle has been found particularly advantageous in reducing to a minimum turbulence serving to restrict discharge from the sumps.

After passing through the sumps, the slurry from each hopper 32, comprised of the liquid and the fallen particles, passes through gate valve 93 to flow line 380 and into the surge tank 400. As indicated by the numeral 410, slurry is discharged through the bottom of surge tank 400, similar to the manner illustrated at the lower left portion of FIG. 1 of the drawings. A motor operated valve 94 is connected between a source of fresh intake liquid and line 42. When valve 94 is opened, the fresh source of liquid is drawn up into line 42. The amount of this make-up water which is admitted into the system through valve 94 is controlled by conventional and well known sump liquid level sensing means coupled to and controlling the motor which operates valve 94. Thus, should the liquid level in sumps vary from a predetermined level, this departure is sensed and valve 94 is actuated to either increase or decrease the amount of liquid in the system. As with the embodiment of FIGS. 1 and 2, siphons 90 interconnect the various sumps 32, 32', and 32" to maintain a uniform sump liquid level. It will be observed, with reference to FIG. 3, that valves 93, preferably gate valves, are adjusted to equalize the pressure drops in the parallel legs 540 and 560.

In the embodiment of FIGS. 3 and 4, the line 540–380 may be considered an exhaust flow line, the line 42 as a second flow line, the line 100 as a third flow line. The line 91 may be considered a flushing line.

It has been further found, with respect to the embodiment of FIGS. 3 and 4 of the drawings, that maximum efficiency is maintained by limiting the discharge slurry density at 410 to approximately 15%. It has further been found that with a hopper dimension of approximately 10' x 20', satisfactory results have been obtained with a flow of approximately 150 g.p.m. exiting through nozzles 840 into a single sump. Further, hydraulic losses have been found to be minimized when the sloping sides of the sumps 32, 32' and 32" have a minimum slope of approximately 45°. Flow lines 380 and 100 are preferably of stepwise varying diameter between the banks 32, 32' and 32", since the quantity of water carried by these lines varies between the banks. Such stepwise variance of flow line diameter is found to reduce pressure drops between the banks 32, 32' and 32", particularly regarding lines 540 and 560. It is to be further observed that line 91 is employed, as in the first embodiment, for a flushing operation on system shutdown.

What is claimed is:

1. An electrostatic precipitator system including a plurality of collecting electrodes and complementary discharge electrodes positioned in a gas flow path within a precipitator, a plurality of hoppers positioned below said electrodes and adapted to contain liquid, a liquid exit orifice in the bottom of each hopper, a liquid surge and storage tank, a first fluid line from said tank serially connecting the said exit orifices and returning to said tank, a second fluid line coupled to a source of fresh liquid, a third fluid line, valve means coupling said second fluid line to said third fluid line and responsive to the level of liquid in said tank, a fourth fluid line from said tank to a waste receiver, said third fluid line exiting to said hoppers and constructed and arranged to impart rotary motion to liquid in the hoppers and to supply make-up liquid thereto as liquid is withdrawn from said system from said fourth fluid line, and siphon means for maintaining the level of liquid the same in each of said hoppers.

2. The system of claim 1 including a flushing line coupled at one end to a source of cleaning fluid and at the other end by a valve to a portion of said first fluid line for cleaning during system shutdown.

3. An electrical precipitator system including a plurality of collecting electrodes and complementary discharge electrodes positioned in a gas flow line within a precipitator, a plurality of hoppers positioned below said electrodes and constructed and arranged to contain liquid, a liquid exit orifice in the bottom of each hopper, an exhaust flow line serially coupling the exit orifices of a plurality of said hoppers, a lisuid storage tank fed by one end of said exhaust flow line, a second flow line from said tank to the input of a pump, a third flow line from the output of said pump to liquid discharge means positioned within said hoppers, said discharge means constructed and arranged to impart rotary motion to the liquid in said hoppers, means responsive to the level of liquid in said hoppers to inject liquid from an external source to the input side of said pump, means for bleeding off slurry from said tank, and siphon means constructed and arranged for maintaining the level of the liquid the same in all of the hoppers.

4. The system of claim 3 including a flushing line coupled at one end and at the other end by a valve to the other end of said exhaust flow line for cleaning during a system shutdown.

References Cited

UNITED STATES PATENTS

| | | | |
|---|---|---|---|
| 1,338,271 | 4/1920 | Welch | 55—117 X |
| 1,413,877 | 4/1922 | Schmidt | 55—122 X |
| 2,614,651 | 10/1952 | Wintermute | 55—120 X |
| 2,614,652 | 10/1952 | Sultzer | 55—120 |
| 2,646,132 | 7/1953 | Beaver | 55—122 X |
| 2,672,946 | 3/1954 | Rabkin et al. | 55—120 |
| 2,673,127 | 3/1954 | Gebhardt. | |
| 2,689,019 | 9/1954 | Roberts et al. | 55—120 X |
| 2,717,658 | 9/1955 | Bethea et al. | 55—431 X |
| 2,802,280 | 8/1957 | Sylvest. | |
| 2,954,097 | 9/1960 | Yellott et al. | 55—466 X |
| 3,109,630 | 11/1963 | Nichols | 55—101 X |
| 1,618,395 | 2/1927 | Ward | 302—15 |
| 1,644,699 | 10/1927 | Ward | 302—15 |
| 1,958,561 | 5/1934 | Bennett | 302—14 |
| 2,504,081 | 4/1950 | Mylting | 302—14 |
| 2,648,572 | 8/1953 | Thorsten | 302—15 |
| 3,381,831 | 5/1968 | Oka | 302—15 X |

FOREIGN PATENTS

| | | |
|---|---|---|
| 988,350 | 4/1965 | Great Britain. |
| 110,609 | 10/1917 | Great Britain. |

HARRY B. THORNTON, Primary Examiner

D. E. TALBERT, Jr., Assistant Examiner

U.S. Cl. X.R.

55—136, 342, 360, 431, 466, 228; 302—14; 137—123, 409, 544, 561; 210—513; 317—2